US011483716B2

(12) United States Patent
Schmidt et al.

(10) Patent No.: US 11,483,716 B2
(45) Date of Patent: Oct. 25, 2022

(54) METHOD AND SYSTEM FOR COORDINATED USE OF MOBILE RADIO FREQUENCIES

(71) Applicant: Sennheiser electronic GmbH & Co. KG, Wedemark (DE)

(72) Inventors: Axel Schmidt, Wedemark (DE); Maria Dolores Pérez-Guirao, Hannover (DE); Konstantin Septinus, Hamburg (DE); Andreas Stefan Wilzeck, Gehrden (DE)

(73) Assignee: Sennheiser electronic GmbH & Co. KG, Wedemark (DE)

( * ) Notice: Subject to any disclaimer, the term of this patent is extended or adjusted under 35 U.S.C. 154(b) by 0 days.

(21) Appl. No.: 17/051,496

(22) PCT Filed: May 7, 2019

(86) PCT No.: PCT/EP2019/061685
§ 371 (c)(1),
(2) Date: Oct. 29, 2020

(87) PCT Pub. No.: WO2019/215152
PCT Pub. Date: Nov. 14, 2019

(65) Prior Publication Data
US 2021/0243607 A1  Aug. 5, 2021

(30) Foreign Application Priority Data

May 7, 2018 (DE) .......................... 102018110903.2

(51) Int. Cl.
*H04W 16/14* (2009.01)
*H04W 12/06* (2021.01)
*H04W 72/04* (2009.01)

(52) U.S. Cl.
CPC ........... *H04W 16/14* (2013.01); *H04W 12/06* (2013.01); *H04W 72/0453* (2013.01)

(58) Field of Classification Search
CPC . H04W 24/10; H04W 16/14; H04W 74/0808; H04W 72/0453; H04W 12/06
See application file for complete search history.

(56) References Cited

U.S. PATENT DOCUMENTS

2013/0272117 A1\* 10/2013 Bagasra .............. H04L 43/0882
370/468
2015/0163761 A1   6/2015 Kwon et al.
(Continued)

FOREIGN PATENT DOCUMENTS

DE    10 2017 100 076    7/2018
EP       3 179 759       6/2017
(Continued)

OTHER PUBLICATIONS

Search Report for Application No. PCT/EP2019/061685 dated Jul. 16, 2019.
(Continued)

*Primary Examiner* — Dai Phuong
(74) *Attorney, Agent, or Firm* — Haug Partners LLP

(57) ABSTRACT

A method and a system with which a primary user, in particular a mobile radio operator, can make a part of the radio spectrum range which is reserved exclusively for the mobile radio operator available in localized and/or time-restricted fashion to a local end user who requested the restricted usage authorization of the radio spectrum range using registered credentials at the mobile radio operator. By way of the credentials the mobile radio operator can allow the local end user limited usage of that radio spectrum range in fee-bearing fashion and can bill same. The local user can then use the assigned frequency band in accordance with his own needs. In particular the user can wirelessly transmit (Continued)

signals in the assigned frequency range between end devices to which no credentials are allocated and in that situation use a transmission protocol which is not defined for the mobile radio network.

11 Claims, 1 Drawing Sheet

(56) References Cited

U.S. PATENT DOCUMENTS

| | | |
|---|---|---|
| 2015/0245374 A1 | 8/2015 | Mitola, III et al. |
| 2017/0188241 A1 | 6/2017 | Mueck et al. |
| 2017/0287085 A1 | 10/2017 | Smith et al. |
| 2018/0132111 A1* | 5/2018 | Mueck ................ H04B 1/715 |
| 2018/0288622 A1* | 10/2018 | Maria ................ H04L 63/0853 |
| 2021/0282022 A1* | 9/2021 | Hathiramani ....... H04W 72/048 |

FOREIGN PATENT DOCUMENTS

| | | |
|---|---|---|
| WO | WO 2013/126085 | 8/2013 |
| WO | WO 2017/044826 | 3/2017 |
| WO | WO 2017/157559 | 9/2017 |

OTHER PUBLICATIONS

Gabriel Brown, Heavy Reading White Paper: Private LTE Networks, pp. 1-11, Jul. 2017.

* cited by examiner

METHOD AND SYSTEM FOR COORDINATED USE OF MOBILE RADIO FREQUENCIES

CROSS-REFERENCE TO RELATED APPLICATIONS

This application is the National Stage entry under 35 U.S.C. § 371 of International Application No. PCT/EP2019/061685 filed May 7, 2019, published as Publication No. WO 2019/215152 on Nov. 14, 2019, which claims benefit of foreign priority of German Patent Application No. 10 2018 110 903.2, filed on May 7, 2018, the entireties of which are herein incorporated by reference.

FIELD OF DISCLOSURE

The present invention concerns a method and a system for coordinated use of mobile radio frequencies.

BACKGROUND

To permit frictionless operation the use of radio frequencies for the wireless transmission of signals is heavily regulated. For use in the mobile radio field given radio frequency ranges are made available in the regulations exclusively for individual users, the mobile network operators (MNO), as primary users. Frequently a primary user has the right to exclusive use of the respective radio frequency range in return for a payment for example to the country which grants the usage authorization.

DE 10 2005 054 258 B4 discloses a method of allocating frequencies for wireless audio communication.

The MNO may use the spectrum range in question for its application. In particular for example it can construct a mobile radio network, as is shown in FIG. 1 in accordance with the state of the art. For that purpose, in the country in which it has the usage rights it can construct a relatively large number of radio stations, so-called "base stations" 20. The base stations 20 are normally connected by way of cables 11 to a central unit, the so-called MNO core network 10. The aim of that construction is to build up a mobile radio network for end devices 30 of end users. The end devices 30 are for example mobile phones or smartphones. Each base station 20 is respectively available in the local region in which it is constructed as a radio communication partner for the end devices 30. If the end user wants to carry on a telephone conversation or transmit data his end device 30 can wirelessly form a radio connection to a base station 20 in the proximity. For use in the mobile radio network each end device 30 normally has a respective individual identification, so-called "credentials" 31. The credentials 31 can be made available to the end device 30 for example by way of a SIM card (Subscriber Identity Module), which can be fitted into the end device 30.

The end user has previously registered with the MNO with his credentials 31. If now an end device 30 makes contact with a base station 20 it transmits its credentials 31 to the base station. The base station transmits the received credentials by way of the connection 11 to the MNO core network 10. If registration of those credentials is to be found there then the MNO makes the services of the mobile radio network available to the end device. In that respect data are exchanged between the end device 30 and the base station 20 utilizing the spectrum range which the MNO may exclusively use, and transmitted by way of the connection 11 and possibly further intermediate stations for example to another end device 30.

The credentials 31 serve to associate each end device 30 with the registration of an end user. The association may include for example a telephone number belonging to the registration of the end user. By way of the credentials 31 the MNO can thus associate a fee-bearing use of its mobile radio network with a registered end user and bill the end use for the costs of the use.

A typical property of such a mobile radio network is that an end device 30 can take part in the data transmission only when it has its own credentials 31. In addition the base stations of the MNO are normally available exclusively in the mobile radio network as a direct communication partner for radio transmission from and to the end devices. Access to resources, in particular on the spectrum range that the MNO may exclusively use is not provided for end devices which do not have credentials 31 registered at the MNO.

SUMMARY OF INVENTION

The object of the invention is to permit more flexible use of the radio spectrum range which is assigned exclusively to a primary user.

That object is attained by a method for coordinated use of mobile radio frequencies as set forth in claim 1 and a system for coordinated use of mobile radio frequencies.

Thus there is provided a method for the coordinated use of mobile radio frequencies, wherein a primary user has an exclusive usage right for a first radio frequency range, comprising the steps:

registration of an end user for identification of the end user on the basis of credentials (141) at the primary user, request from the end user to the primary user for a time-restricted and/or location-restricted usage of a portion of the first radio frequency range, wherein the request includes a definition of the requested restricted usage and statement of the registered credentials (141) of the end user, matching the requested usage with already granted access rights in a central database of the primary user and selection of a frequency band which is not otherwise allocated, detection of the allocation of the selected frequency band and the data for definition of the time-restricted and/or location-restricted usage and the associated credentials (141) in the central database of the primary user, communication of an allocation information which defines the restricted usage inclusive of the selected frequency band from the primary user to the end user, development of a private network (150) by the end user, wherein the private network (150) includes at least one private base station (100, 101, 102) and at least one end device (130-136) as components of the private network (150), wherein the at least one end device (130-136) does not have credentials registered at the primary user, and wherein the at least one end device (130-136) performs a wireless signal transmission, wherein at least a part of the selected frequency band is used, and wherein the components of the private network (150) are so configured that a wireless signal transmission is effected corresponding to the restricted usage defined by the allocation information.

According to an aspect of the invention the primary user is a mobile network operator (MNO).

According to a further aspect of the invention the mobile radio operator has defined protocols in accordance with which it supports a mobile communication within the first radio frequency range, and in the wireless transmission within the private network (150) a transmission protocol is used, that does not correspond to the protocols defined by the mobile network operator.

According to a further aspect of the invention the request is made by way of a connection (111) and communication of the allocation information is effected by way of the connection (111).

According to a further aspect of the invention the private network (150) has a private core (140) which implements resource distribution for the wireless transmission within the private network (150).

According to a further aspect of the invention the primary user uses the credentials received with the request to bill the end user costs for the allocated restricted usage.

According to a further aspect of the invention the at least one end device (130-136) includes means which prevent the at least one end device (130-136) implementing usage of radio frequencies outside the allocated restricted usage.

In addition there is provided a system which implements the described method for coordinated use of mobile radio frequencies.

Further configurations of the invention are subject-matter of the appendant claims.

BRIEF DESCRIPTION OF THE DRAWINGS

Advantages and embodiments by way of example of the invention are described in greater detail hereinafter with reference to the drawings.

DETAILED DESCRIPTION

Figure 1:
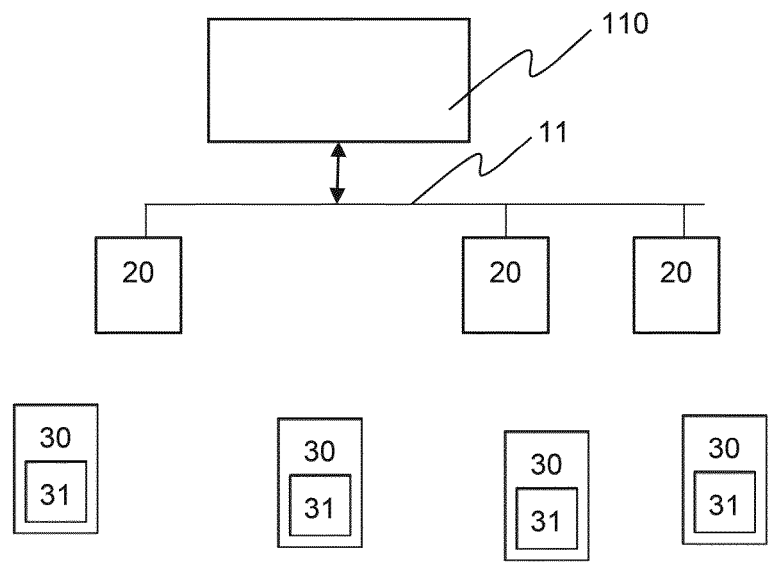
FIG. 1 diagrammatically shows the structure of a mobile radio network according to the state of the art, and FIG. 2 diagrammatically shows the structure of a mobile radio network with a private network according to the invention.

FIG. 1 diagrammatically shows the structure of a mobile radio network according to the state of the art. In this arrangement the MNO core network 10 maintains complete control over the precise manner of usage of the exclusively used radio spectrum range as far as each individual end device 30.

It may however be desirable to locally allow use of parts of the exclusively used radio spectrum range by devices which themselves do not have credentials 31 registered with the MNO. That can involve for example an event at which a number of microphones are to be wirelessly operated with radio transmission of audio signals. Optionally wireless radio transmission of audio signals for an in-ear monitoring (IEM) system can additionally be provided. Such wireless systems are referred to as "programme making and special event" (PMSE) systems. For that kind of application a particularly short lag in the transmission of the audio data is important. In particular the time lag due to radio transmission should be less than 1 ms.

It would be conceivable for each microphone and each wireless receiver of an IEM system to be provided in the system with its own credentials so that each of those devices can individually connect to a base station of the MNO in order then to communicate by way of the mobile radio network. With that procedure however observation of the short transmission time is scarcely to be reliably guaranteed.

The present invention concerns the notion of making a part of the radio spectrum range which is reserved exclusively for the MNO available in localized and/or time-restricted fashion to a local end user who has requested the restricted usage authorization of the radio spectrum range using registered credentials at the MNO core network. Therefore in response to the local end user request the MNO core network can allocate a given part of the radio spectrum range in localized and/or time-restricted fashion. By way of the credentials the MNO can allow the local end user restricted usage of that radio spectrum range for a fee and can bill same. The local user can then use the assigned frequency band according to his own needs. In particular in the assigned frequency range he can wirelessly transmit signals between end devices to which no credentials are assigned. Access to MNO base stations is not required for that purpose and there is also no need to use a transmission protocol which is defined for the mobile radio network. Finally there is a lease system which is compatible with the mobile radio network and in which the MNO can lease parts of its exclusive access rights to its radio spectrum range to the local end user. That has the advantage for the lessee that he can exclusively use the leased radio frequency range. That is crucial in particular when a high level of transmission security has to be guaranteed. That concerns inter alia PMSE systems. It can however also be essential for wirelessly controlled manufacturing installations for example if the wireless transmission is used in a closed control circuit in automation technology.

For coordination of the leasing the MNO can run a central database in which it stores the access rights granted to it with detection of the associated time, location and frequency range for the usage. There can be a great time gap between the request from the local end user and use of the allocated radio frequencies. For example a concert event with a PMSE system is often already planned months in advance so that the planner can place his request to the MNO at a suitably early time. On the basis of the entries in the central database the MNO can ensure that it grants the restricted usage rights only once in each case so that the promised restricted exclusive usage rights do not overlap with further granted access rights.

Depending on the respective request the access right may be granted exclusively or non-exclusively. If it is granted exclusively the MNO has to ensure that it itself does not allow any other usage and that its own mobile radio network in the leased range does not perform any sending activities.

Authentication of a registered end user on the basis of the credentials can be made more secure against hacking by the credentials being made available to the user in a technically individualized form. In particular that can be effected by a SIM card which is made available to the end user for example by an MNO. The request for use of frequencies is accepted only when it comes from an end user who has the SIM card or a suitably individualized form of the credentials.

The use of credentials for awarding partial usage rights to the radio frequency range of a primary user for creating private networks by an end user is advantageous in particular because the use of credentials at an MNO for the use of a mobile radio network with mobile phones which respectively have their own credentials by way of SIM cards is already in use. The use of that existing credential system can therefore be expanded according to the invention to the provision of private networks.

In accordance with the invention it is also possible that the primary user does not himself perform management of credentials and distribution of usage rights to his radio frequency range but that is effected by way of third parties. In that case however ultimately the use of a part of the radio frequency range is allowed to an end user who can be identified by way of credentials.

Figure 2:
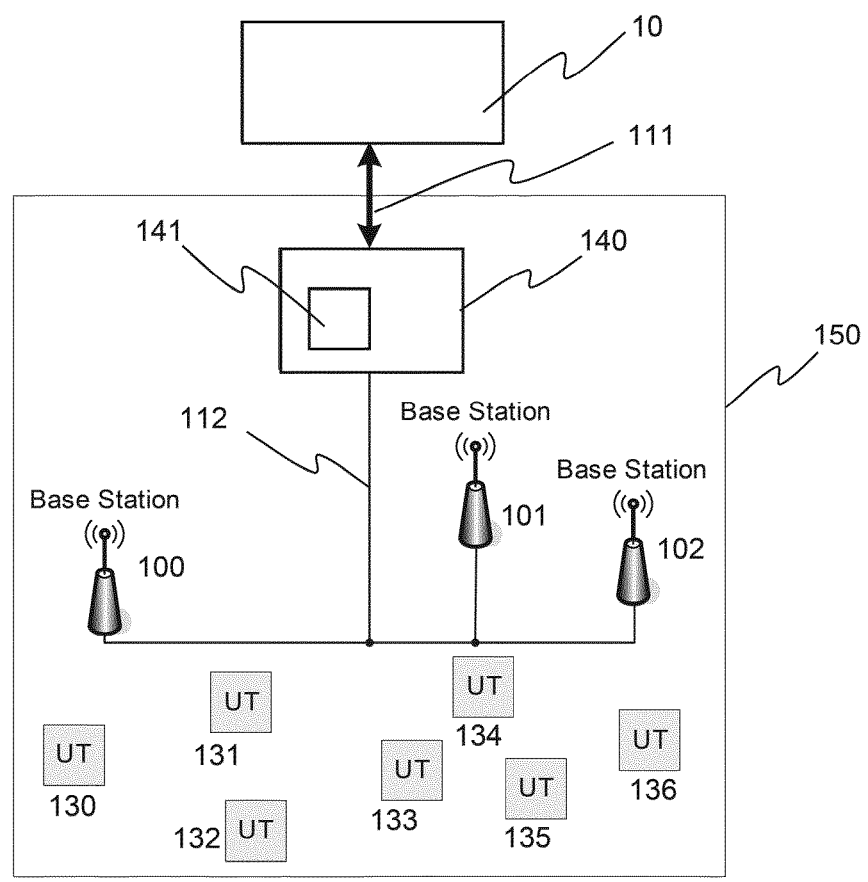

FIG. 2 diagrammatically shows the structure of a mobile radio network with a private network 150 according to the invention. The MNO core network 110 is connected by way of a connection 111 to a "private core" (PC) 140. The connection 111 forms an interface between the MNO core network 110 and the private core 140 and can be wired or wireless. The private core 140 has dedicated credentials 141 which are registered with the MNO and with which it can register with the MNO core network 110. By way of the connection 111 it can make a request for location-restricted and/or time-restricted usage of a frequency range to the MNO core network 110. The MNO core network 110 then matches the request to the booking allocations registered in the central database, allocates a given radio frequency band to the private core 140 and communicates that information to the private core 140 by way of the connection 111. In that case it is also possible for a plurality of separate radio frequency bands to be allocated to the private core 140. The credentials 141 can be made available to the private core 140 end user in a technically individualized form. By way of example for that purpose a SIM card can be inserted in the private core 140.

The private network 150 includes at least one private base station 100. It can be connected to the private core 140 by way of a connection 112. Alternatively the private base station 100 can be part of the private core 140. It is also possible for a plurality of private base stations 100, 101, 102 to be connected to the private core 140 by way of the connection 112.

Belonging to the private network 150 is at least one end device 130 which can be referred to as a "user terminal" (UT). That can involve for example a wireless microphone or the receiver of a monitoring system. Normally there are a plurality of user terminals 130 through 136 in the private network 150.

The private core 140 performs local management of the radio transmission between the components associated with the private network 150. In particular it implements allocation of radio transmission resources between the private base stations 100, 101, 102 and the user terminals 130 through 136. The private core 140 therefore specifically establishes how the wireless transmission is to be implemented within the private network. In that respect care is to be taken to ensure that exclusively radio frequency ranges which lie within a frequency band allocated to it are used. If a plurality of private base stations 100, 101, 102 belong to the private network 150 then the private core 140 also takes over "mobility control", that is to say control which of the private base stations has a respective radio connection from a respective end device 130 through 136.

The request with which the private core 140 requests a location-restricted and/or time-restricted usage of a frequency range at the MNO core network 110 must include all necessary information for defining the intended usage. That includes in particular a location and/or a period of time as well as information about the desired bandwidth of the radio spectrum range. Numerous further items of information can be added to give a more precise definition. For example it can be established whether a given bandwidth is to be continuously used. A more precise definition of the desired range can also be provided in regard to establishing the location. Certain factors of the location can also be taken into consideration, which influence the distribution of radio signals at that location. Optionally such factors can be measured in advance for example for a given event hall and stored. In the request from the private core 140 to the MNO core network 110 the known event hall can then be specified as the location so that all necessary data are known from the start.

The interface by way of the connection 111 has to be suitably defined to be able to communicate those details. The central database of the MNO must also be equipped to receive all essential data.

Equally the allocation information from the MNO core network 110 to the private core 140 must also include all data that define for the private core 140 the rights allocated to it.

In summary the system according to the invention fulfills the task of permitting a private local network under the following general conditions:

the radio spectrum range used belongs to a dedicated primary user, for example a mobile network operator (MNO).

the private network can be based both on International Mobile Telecommunications (IMT) technology, therefore for example on transmission protocols which are defined for the mobile network, and also proprietary transmission technology, that is to say for example on transmission protocols which are not defined for the mobile network.

the private network does not grant any general mobile radio access.

the primary user makes frequency management available, it therefore establishes the radio frequency range which may be used by the private network.

the user of the private network performs resource management, that is to say establishing the specific use of the available radio frequency range.

the private network can form a connection to a core network of an MNO. It is however not absolutely necessary for that connection also to occur during use of the allocated radio frequency ranges. If the connection does not exist during the usage the private network operates as a stand-alone system.

the private network has a time-restricted and/or location-restricted extent. The time duration can be days or even months or years.

For that purpose there is provided a method with which the individual user terminals 130 through 136 are admittedly only authenticated within the private network, but transfer and assignment of frequency usage rights are appropriately detected and can be used for example for billing purposes.

The MNO core network must make the following minimum functions available for the private network:

frequency management (session management), that is to say assignment of radio frequency ranges which the private network may use, and management of the access rights to ensure possibly exclusive access of the private network, authentication/identification of the private network in particular by way of credentials, and licensing of the private network, regulation of the exclusive frequency access for the private network that is to say granting the rights for usage of the allocated radio frequency range.

The private core has the following essential tasks:
resource management,
quality of service (QoS) control/monitoring,
authentication of the user terminals (UT), that is to say the end devices of the private network, and
mobility control.

Authentication of the overall private network is effected by way of the interface between PC and MNO core network. The PC passes its credentials inclusive of the additional data relating to the desired usage of the private network like for example time duration, local extent and frequency requirement to the MNO core network and receives a permit for the corresponding exclusive usage of the allocated frequency ranges. That permit procedure can take place at any time prior to use of the frequency ranges. The QoS within a private network is ensured by the PC.

Authentication of the UTs in the private network is effected by way of the PC and not by way of the MNO core network. Accordingly only the PC of the private network is identified in the MNO network, for example by way of a SIM card. Billing of a private network can be effected for example on the basis of the location, period of time and the frequency requirement.

A problem can occur in that the end devices 130 through 136 can be activated independently of the private network 150. If for example the private core 140 has allocated a sending frequency to a microphone 130 then that microphone will then transmit on that frequency. If a user switches off the microphone 130 the transmission ends. If the user switches on the microphone again at a later time, possibly even only on another day, then without further measures he will continue to transmit on the frequency allocated to him. As however the usage right leased by the MNO is time-restricted it may happen that, at the later time, there is no longer any authorization at all to transmit on that frequency. According to an aspect of the invention measures can be provided for averting an inadvertent frequency usage after the lease time. Optionally for that purpose when switching on the microphone firstly a connection can be formed with a base station of the private core 140 before the microphone transmits on the set transmission frequency. It is only when the private core has confirmed that the usage is allowed at the current time that the microphone begins to transmit. Alternatively the end device 130 can be equipped with a clock function and the private core can then communicate to the end device the time at which the lease time ends. From that time on the end device can then end transmission on the allocated frequency. Corresponding measures for deactivation of transmission on a frequency allocated by the private core can also be adopted when leaving the location for which the radio frequencies were leased. For that purpose the end device can be equipped with a location detection unit which for example by way of GPS determines the location of the end device 130. Means are therefore provided to prevent the end devices 130 using the allocated radio frequencies outside the acquired right.

A further problem can occur if an event lasts longer than previously planned. Insofar as the private core 140 is connected to the MNO core network 110 by way of a connection 111 during the event then the private core 140 can preferably ask for a prolongation of the lease duration with a time safety margin. If the private network 150 is for example still in use 30 minutes before the end of the lease time then in accordance with an aspect of the invention the private core can automatically request a prolongation by a given period, for example 30 minutes, and upon a successfully allocated prolongation can suitably control the elements belonging to the private network 150.

The invention claimed is:

1. A method for the coordinated use of mobile radio frequencies, wherein a primary user has an exclusive usage right for a first radio frequency range, comprising the steps:
   registration of an end user for identification of the end user on the basis of credentials at the primary user,
   request from the end user to the primary user for a time-restricted and/or location-restricted usage of a portion of the first radio frequency range, wherein the request includes a definition of the requested restricted usage and statement of the registered credentials of the end user,
   matching the requested usage with already granted access rights in a central database of the primary user and selection of a frequency band which is not otherwise allocated,
   storing of the allocation of the selected frequency band and the data for definition of the time-restricted and/or location-restricted usage and the associated credentials in the central database of the primary user,
   communication of an allocation information which defines the restricted usage inclusive of the selected frequency band from the primary user to the end user,
   establishing a private network by the end user, wherein the private network includes at least one private base station and at least one end device as components of the private network,
   wherein the at least one end device does not have credentials registered at the primary user, and
   wherein the at least one end device performs a wireless signal transmission, wherein at least a part of the selected frequency band is used, and
   wherein the components of the private network are so configured that a wireless signal transmission is effected corresponding to the restricted usage defined by the allocation information.

2. The method for the coordinated use of mobile radio frequencies as set forth in claim 1, wherein the primary user is a mobile network operator (MNO).

3. The method for the coordinated use of mobile radio frequencies as set forth in claim 2, wherein the mobile radio operator has defined protocols in accordance with which it supports a mobile communication within the first radio frequency range, and
   wherein in the wireless transmission within the private network a transmission protocol is used, that does not correspond to the protocols defined by the mobile network operator.

4. The method for the coordinated use of mobile radio frequencies as set forth in claim 1,
   wherein the request is effected by way of a connection and the communication of the allocation information is effected by way of the connection.

5. The method for the coordinated use of mobile radio frequencies as set forth in claim 1, wherein the private network has a private core which implements resource distribution for the wireless transmission within the private network.

6. The method for the coordinated use of mobile radio frequencies as set forth in claim 1, wherein the primary user uses the credentials received with the request to bill the end user costs for the allocated restricted usage.

7. The method for the coordinated use of mobile radio frequencies as set forth in claim 1, wherein the at least one end device includes means which prevent the at least one end device implementing usage of radio frequencies outside the allocated restricted usage.

8. A private core for a coordinated use of mobile radio frequencies in a private network,
   wherein a primary user has an exclusive usage right for a first radio frequency range, and
   wherein the private core has credentials with which an end user is registered with the primary user for identification of the end user, and
   wherein the private core has an interface in order to make a request for a time-restricted and/or location-restricted usage of a part of the first radio frequency range by way of a connection to an MNO core network of the primary user, and
   wherein the request includes a definition of the requested restricted usage and the statement of the registered credentials of the end user, and
   wherein the private core is adapted to receive by way of the connection an allocation information from the MNO core network which defines the restricted usage inclusive of a frequency band selected from the MNO core network, and
   wherein the private network includes at least one private base station and at least one end device as components of the private network, and
   wherein the at least one end device does not have credentials registered with the primary user, and
   wherein the private core is adapted to configure the components of the private network, and
   wherein the private core so configures the components of the private network that a wireless signal transmission is effected corresponding to the restricted usage defined in the allocation information, and
   wherein the at least one end device performs a wireless signal transmission, wherein at least a part of the selected frequency band is used.

9. The private core for the coordinated use of mobile radio frequencies as set forth in claim 8, wherein the primary user is a mobile network operator (MNO).

10. The private core for the coordinated use of mobile radio frequencies as set forth in claim 9, wherein the mobile radio operator has defined protocols in accordance with which it supports a mobile communication within the first radio frequency range, and
   wherein in the wireless transmission within the private network a transmission protocol is used, that does not correspond to the protocols defined by the mobile network operator.

11. The private core for the coordinated use of mobile radio frequencies as set forth in claim 8, wherein the at least one end device includes means which prevent the at least one end device implementing usage of radio frequencies outside the allocated restricted usage, and wherein the private core is adapted to configure said means.

* * * * *